United States Patent [19]

Ferrier

[11] 3,768,909

[45] Oct. 30, 1973

[54] DEVICE FOR MEASURING THE POSITION OF A RECEDING MOVING OBJECT IN RELATION TO A REFERENCE SYSTEM

[76] Inventor: Noël Henri Léon Ferrier, Montmorency, France

[22] Filed: Dec. 20, 1971

[21] Appl. No.: 209,532

[30] Foreign Application Priority Data
Dec. 24, 1970 France .............................. 7046629

[52] U.S. Cl. ............. 356/138, 250/203 R, 250/234, 356/4, 356/152
[51] Int. Cl. ........................ G01b 11/26, G01c 3/08
[58] Field of Search ........................ 356/138, 152, 4; 250/203 R, 203 CR, 213 R, 234

[56] References Cited
UNITED STATES PATENTS

| | | | |
|---|---|---|---|
| 2,966,823 | 1/1961 | Trimble............................ | 250/203 R |
| 2,958,784 | 11/1960 | Blackstone et al.............. | 250/203 R |
| 3,593,286 | 7/1971 | Altman........................... | 250/203 CT |
| 3,651,326 | 3/1972 | Alpers ........................... | 250/203 CT |

*Primary Examiner*—David Schonberg
*Assistant Examiner*—V. P. McGraw
*Attorney*—John J. McGlew et al.

[57] ABSTRACT

The device includes a viewing instrument with which is associated an analyzer for continuously analyzing the picture of a background against which a missile moves. The analyzer comprises an image dissector tube operable to successively analyze the image vertically and thereafter horizontally. Two devices are associated with the dissector tube to gradually reduce the solid angle of sweep as the missile approaches its target and its trajectory tends to coincide with the aim axis or boresight, utilizing the same number of scan lines to provide a dissection of the image into the same number of points but with a periodicity of the analysis. The first device, which has a high time constant, is a variable focal length optical system programmed according to the type of missile fired and the range of the target. The second device, which has a low time constant, slaves the dimensions of the scanned area to the magnitude of the missile deviations to the boresight. Spurious landscape signals are eliminated directly upon the output of the dissected tube, and only the missile tracking signal is permitted to pass through.

8 Claims, 1 Drawing Figure

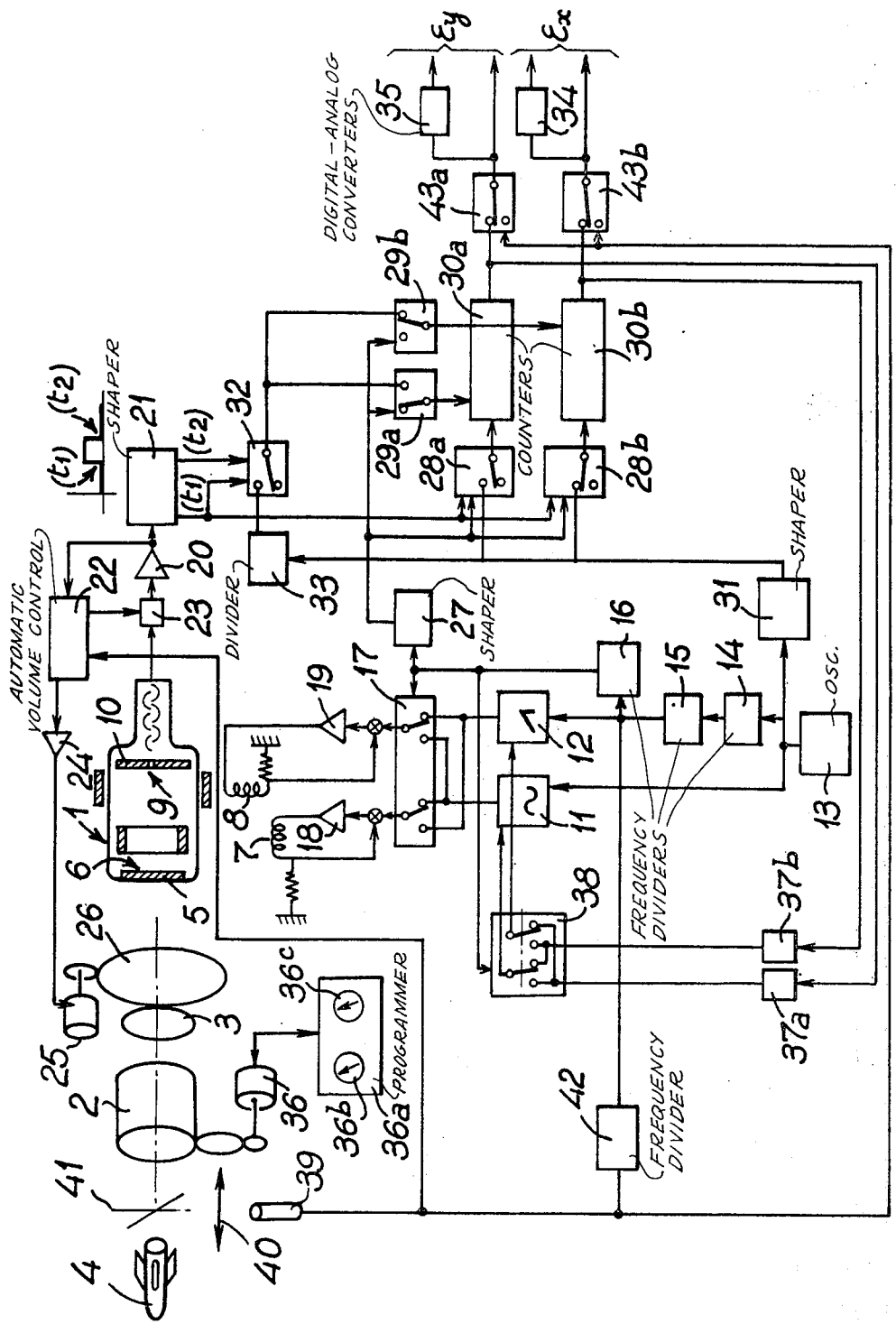

3,768,909

DEVICE FOR MEASURING THE POSITION OF A RECEDING MOVING OBJECT IN RELATION TO A REFERENCE SYSTEM

FIELD AND BACKGROUND OF THE INVENTION

This invention relates to missile tracking devices and, more particularly, to a missile tracking device analyzing the image of the landscape and the missile by scanning it with a large number of lines in order to retain good tracking accuracy even though the missile is continuously receding from the tracking device.

In French Pat. No. 69/34912 filed Oct. 13, 1969, there is described a missile tracking device which analyzes the image of the landscape and the missile by scanning it with a large number of lines in order to retain good tracking accuracy despite the fact that the missile is continuously receding from the tracking device. When the missile (which may be rendered visible by a luminous tracer, for example) is travelling towards a previously identified target, its distance keeps increasing, and tracking accuracy is normally inversely proportional to this distance, while the intensity of illumination received by the tracker is inversely proportional to the square of this distance. In seeking to provide state-of-art electronics for the tracking device, the image may be periodically analyzed at a frequency which may be insufficient in cases where rapidity of response is crucial for guiding certain types of missile.

SUMMARY OF THE INVENTION

It is the object of the present invention to be able to preserve tracking accuracy notwithstanding an increase in the rapidity of the analyses.

The tracking device according to this invention gradually reduces the solid angle of sweep as the missile approaches its target and its trajectory tends to coincide with the aim axis (hereinafter referred to as the boresight), and this with the same number of scan lines, that is to say with a dissection of the image into as many points, but with a higher periodicity of the analyses, in order to retain good tracking accuracy.

This is achieved in one specific embodiment of the invention by means of two devices. The first device, which has a high time constant, is a variable-focal-length optical system programmed according to the type of missile fired and the range of the target. The second device, which has a low time constant, slaves the dimensions of the scanned area to the magnitude of the missile deviations from the boresight. The scanned area, which contains the image of the missile at all times, consequently decreases as the missile approaches its target and its image moves gradually closer to the optical axis of the tracker.

In order to maintain satisfactory and undiminished tracking accuracy, the scanned area is always analyzed by the same number of lines.

Further, in the aforementioned patent, the tracking device analyzed the image of the landscape periodically in consecutive horizontal and vertical scans. The signals picked up during the first horizontal scan were retarded to enable them to be compared with those picked up during the subsequent horizontal scan. Similarly, the signals picked up during two consecutive vertical scans were compared. As a result of these comparisons, only the moving signal corresponding to detection of the missile appeared, and the fixed signals illustrating the landscape were erased.

This arrangement, which required a delay circuit and a comparison circuit at the output end of the image dissector tube (one for the horizontal channel, the other for the vertical channel), may be simplified in accordance with this invention by eliminating the spurious landscape signals directly upon output from the image dissector tube and allowing only the missile tracking signal to pass through.

The description which follows with reference to the accompanying non-limitative exemplary drawing will give a clear understanding of how the invention can be carried into practice.

BRIEF DESCRIPTION OF THE DRAWING

The signal FIGURE in the drawing is a block diagram of a preferred embodiment of the invention, showing the manner of operation of the device for the purpose of remotely detecting the position of an object.

DESCRIPTION OF THE PREFERRED EMBODIMENT

As in the aforementioned patent, an optical beam or boresight from the viewing instrument to the target is stabilized by gyroscopic means and insulated from external motion or vibration and is kept aimed at a target identified beforehand. A tracking device analyzes a projected optical image of a landscape, a target and a missile by successive scans. The coordinates of the missile with respect to reference axes are obtained by successive scan sequences performed on the optical image in azimuth and elevation, by counting at each sequence the number of scan lines separating the centre of the missile image from the reference axis.

In the single FIGURE, an image dissector tube 1, well known per se is equipped with optics 2, which may be a variable focal length optical system or, better still, a progressively magnifying zoom lens. An interference filter 3 inserted between image dissector tube 1 and optical system 2 accentuates the contrast in the optical image to assist detection of a tracer with which a missile 4 is equipped.

The optical image of the landscape through which the missile 4 moves is projected onto the photocathode 5 of a dissector tube 1 by means of optics 2. Photocathode 5 is coated with a light-sensitive substance and emits an electron pattern off its inner surface 6. Two scan coils 7 and 8 of dissector tube 1 are mutually perpendicular and are energized in turn whereby to deflect in both directions, horizontally and vertically, the electron pattern or image 6 which passes through the aperture 9 of a diaphgram 10 at a high frequency in relation to the movement of the missile 4 to be tracked. The electronic image 6 is analyzed periodically in consecutive horizontal and vertical scans.

In order to permit very rapid analysis of the electronic image (every 2 milliseconds for example) with satisfactory definition and with substantially standard optics, the image can be dissected into 200 points by adopting a frequency of 100 kHz for the sinusoidal line scan, a frequency of 1 kHz for the image scan and a frequency of 500 kHz for the rate at which the energizing power is switched between the scan coils.

A generator 11 delivers a sinusoidal signal with a frequency of 100 kHz and a second generator 12 a sawtooth signal with a frequency of 1 kHz. These signals are obtained from an oscillator 13 and two frequency dividers 14 and 15. A third frequency divider 16 furnishes a 500 Hz signal for switching the power supplied to the scan coils. These scan sginals are switched at 17 and amplified at 18 and 19 and feed the scan coils 7 and 8.

In addition to the effect of the interference filter and in order to entirely eliminate the landscape signals issuing from image dissector tube 1, only signals above a certain threshold are exploited, and these signals, which result from tracking of the missile, are amplified at 20 and shaped at 21. The missile tracking signal is shown in its shaped form beside the shaping unit 21.

In order to facilitate exploitation of these signals, their amplitude is maintained constant irrespective of the light intensity received by photocathode 5. An automatic volume control 22 permits of making this adjustment by utilizing the signal amplified at 20 to adjust the voltage at the input to amplifier 20 by means of a multiplier 23. This device has a very short response time and limited variation. For a large variation in luminosity, and by means of an amplifier 24 and a motor 25, the automatic volume control 22 slaves a variable-opacity disc 26. This servo control has a longer response time, but the combination of the two simultaneously operating devices allows rapid and broad adjustment to be achieved.

Missile trajectory errors are determined by counting the number of scan lines separating the centre of the missile image from the reference axis. Let N be the number of scan lines the last one of which is the first to detect the missile, X the number of lines which scan the missile image and L the number of scan lines the last one of which coincides with the optical axis of the image dissector tube. The position of the missile axis with respect to the reference axis of the optical system, namely the boresight, is given by :

$$E = L - (N + X/2)$$

The 500 Hz frequency signal issuing from frequency divider 16 subsequent to shaping at 27 switches this frequency as necessary to gates 28a, 28b, 29a and 29b placed at the input ends of two counting devices 30a and 30b each of which includes an add-substract unit, a memory and a comparator (none of which is shown on the drawing).

Initially the state of counting device 30a expresses the number of lines Ly defining the position of the horizontal reference axis and that of counting device 30b expresses the number of lines Lx defining the position of the vertical reference axis. The values Ly and Lx are preset and periodically updated.

Assuming, as shown in the drawing, that image dissector tube 1 effects a breadthwise analysis of the projected image landscape, then gates 28b and 29b will be conducting from the outset of the scan sequence and gates 28a and 29a will be blocked.

Gate 28b lets through the 100 kHz line frequency signal delivered by oscillator 13 after shaping at 31. Counting device 30b subtracts, from the preset Lx lines, the number N of scan lines elapsing until the appearance of the missile detection signal (leading edge $t1$) blocks the gate 28b which is connected to shaping unit 21. The device 30b substracts if N is less than Lx, or subtracts and adds if N is greater than Lx. The appearance of the missile detection signal also enables the gate 32 for the duration of the missile detection period, that is to say until the downslope $t2$ appears.

In order that counting device 30b should subtract and/or add one half the number X of lines which scan the missile image, the 100 kHz line frequency is divided by two at 33 and applied via gates 32 and 29b to the input end of counting device 30b. It will be manifest that counting device 30b will effect the summing Lx − (N + X/2) which determines both the sense and the magnitude of the error (Ex) in the trajectory of missile 4 relative to the vertical reference axis.

At the end of the breadthwise scan, switch 17 reverses the power supply coils 7 and 8, gates 28a and 29a are enabled and gates 28b and 29b are disabled. The second counting device 30a deducts, from the preset Ly lines, the number N of scan lines elapsing until the appearance of the missile detection signal that disables gate 28a and enables gate 32. Via gate 29a, gate 32 causes the 500 Hz signal to be applied to counting device 30a for the counting of the X'/2 lines which scan the missile image.

Counting device 30a effects the summation Ly − (N'+X'/2) which gives both the sense and magnitude of the error (Ey) in the trajectory of missile 4 relative to the horizontal reference axis.

The errors (Ex) and (Ey) expressed as a number of lines in each case can be translated into analog form by digital/analog converters 34 and 35.

As the missile approaches its target, the distance between it and the detection device increases. In order to retain great 'fineness' in the detection, two devices simultaneously and progressively reduce the solid angle of sweep. The first of these devices, well known per se, is a variable-focal-length optical system and preferably a zoom lens 2 slaved by a motor 36 which is controlled by a programmer 36a, according to the type of missile (control 36b) and the range of the target (control 36c). The other device includes means for adjusting the scan amplitudes as a function of the missile error. The missile error signals Ex and Ey delivered respectively by counting devices 30b and 30a are used to adjust the scan amplitudes to the dimensions $2k$ (Ex +Count) and $2k$ (Ey + Count).

The value of the constant is determined so that the image of missile 4 is adequately contained within the swept area. A switch 38 driven in step with the rate at which the power supplies to scan coils are switched, appropriately steers the correction signals resulting from the scanning process to sine wave generator 11 and sawtooth generator 12. In the case of a breadthwise scan the amplitude of the sine wave signal delivered by generator 11 is $2k$ (Ex + Count) and that of the sawtooth signal delivered by generator 12 is $2k$ (Ey + Count), and vice versa in the case of a vertical scan.

The area of scan decreases gradually and ultimately becomes equal to $(2k.\ \text{Count})^2$ over the terminal portion of the missile's trajectory, when the latter is aligned upon the boresight, and this area is always scanned by the same number of lines. If for any reason the missile should suddenly deviate from its trajectory and its image tend to overshoot the scanned area, the rapidity of the analyses and the short response times of the scan amplitudes would instantly enlarge the scanned area so as not to lose the missile image.

Initially, the positions of the tracking device's reference axes are defined as numbers of lines Lx and Ly preset into the counting devices 30a and 30b.

The use of a zoom system 2 and the timewise variations in the position of image dissector tube 1 and in the position of scan coils 7 and 8 with respect to that of the optical system necessitate a redefinition of the positions of the tracking system's reference axes.

Periodically, say every 20 scans, the image of the background and the missile is erased and replaced by a punctual image of a light source 39 produced by an optical system 40 at the intersection of a reticle 41 defining the boresight. Erasure of the image of the background and the missile is accomplished with the automatic volume control 22 which desensitizes image dissector tube 1 throughout this sequence. Each scan, which counts the N scan lines elapsing until the punctual image is detected, defines the position of a reference axis with respect to the start of the scan. The new $Ly$ and $Lx$ values, which define the positions of the reference vertical and horizontal axes respectively, are stored in counting devices 30b and 30a until the next updating.

A frequency divider 42 activates the sequences for redefining the positions of the reference axes and blocks the gates 43a and 43b so as to arrest the delivering of missile error signals throughout the duration of these sequences, the gates 43a and 43b being positioned at the output ends of counting devices 30a and 30b respectively.

It goes without saying that many detail changes and substitutions may be made in the specific embodiment hereinbefore described, without departing from the scope of the invention. By way of example, the scan signal and switching frequencies, which have been chosen for the sake of simplicity, may be different, as may also the number of frequency dividers shown on the drawing.

What I claim is :

1. In a device for measuring the position of a distant and receding moving object relative to a reference system having an axis, particularly for detecting the position of a missile and guiding it toward a distant target, of the type including detection means in the form of a viewing instrument, having a reference optical axis, and projecting the picture of a background, against which the object moves, onto the photocathode of a cathode ray dissector tube having analyzing means continuously analyzing the projected picture in periodic successive vertical and horizontal directions along respective vertical and horizontal scan lines, and means operable to determine, from the analysis, the position coordinates of the object: the improvement comprising means operatively associated with said detection means and operable, as the image of the object progressively approaches coincidents with said reference axis, to reduce progressively the solid angle analyzed by said detection means while maintaining constant the number of vertical and horizontal scan lines.

2. A device as claim in claim 1, in which said means for reducing progressively the solid angle analyzed by said detection means comprises first and second simultaneously operating adjusting devices; said first adjusting device being constituted by a variable focal optical system controlled as a function of the type of missile and a function of the target range; said second adjusting device being constituted by servo means electrically adjusting the dimensions of the area scanned by said detection means; said dimensions of said area being a function of the deviations of the missile from said reference optical axis.

3. A device, as claimed in claim 2, in which said variable focal optical system is a zoom lens operable by control means connected to a progreammer having one input which is a function of the type of missile and another input which is a function of the target range.

4. A device, as claimed in claim 1, including servo means connected to said dissector tube and delivering, at its output, a constant amplitude signal irrespective of variations in the luminous intensity received by said photocathode; said servo means including first and second output signal amplitude adjusting devices; said first output signal amplitude adjusting device being a short-time-constant, low-variation adjusting device constituted by an automatic volume control connected to the output of an amplifier included in said servo means, and utilizing the output signal of said amplifier to adjust the voltage at the input of said amplifier, said second signal amplifier tube adjusting device having a slow response time and being constantuted by a variable opacity disk positioned in front of said dissector tube and a motor coupled to said disk and electrically connected to said automatic volume control; whereby the association of said two signal amplitude adjusting devices in simultaneous operation, permits obtaining rapid adjustment over a wide range.

5. A device, as claimed in claim 1, including first and second identical counting devices; said first counting device being responsive to horizontal scanning and said second counting device being responsive to vertical scanning, of the image to be analyzed; said first and second counting devices obtaining, in relation to said reference optical axis, the missile trajectory errors and azimuth and elevation, by deriving during each periodic successive vertical and horizontal scanning sequence, the difference between the number of scan lines, the last one of which coincides with said referencce optical axis, and the sum of the number of scan lines, the last one of which detects the missile for the first time, plus one half the number of lines scanning the missile image.

6. A device, as claimed in claim 5, in which each counting device has an initial state which expresses the number of lines, the last one of which coincides with said reference optical axis; a first electronic gate having a gate unblocking input; a scan-switching-pulse--generating frequency divider; a first shaping unit connecting said scan-switching-pulse-generating frequency divider to said unblocking unput of said first electronic gate; said first electronic gate having a second input; a second gate activated by a first signal shaper connected to the output of said dissector tube and which detects the appearance of the first missile detection signal; said second gate being connected to said second input of said first gate; a line scan frequency generating oscillator; a halving divider connected to the input of said second gate; a second shaping unit connecting said line scan frequency generating oscillator to said halving divider; said first gate having an output electrically connected to said first counting device, said first counting device having a second control input connected to a third electronic gate electrically connected directly to said second shaping unit, said third electronic gate having first and second control inputs, said first control input being connected to said first shaping unit and said second control input being electrically connected to a third shaping unit; and an image frequency signal generator electrically connected to said third shaping unit;

whereby, subsequent to said initial state, the number of lines, the last one of which detects the missile image for the first time, is transmitted to said first counting device together with half the number of lines scanning the missile image, with deduction from said initial state, by said first and third electronic gates, respectively, and unblocking of said third gate occurring simultaneously with the existence of the missile detection signal.

7. A device as claimed in claim 6, comprising, by reason of the fact that the variation in the solid angle requires a periodic definition of the position of the reference axis with respect to the start of the scans, substitution means; said substitution means being activated during at least one horizontal scan and at least one vertical scan; associated means operable to erase the image of the background; a light source; optical means operable to produce, at the intersection of a reticle, positioned in advance of said dissector tube, a punctual image of said light source; said substitution means being operable to replace the erased image of the background by said punctual image; said counting devices being operable to detect the punctual image in the same manner as the missile image; whereby the numbers of lines counted between the punctual image and the start of each scan define the positions of said reference axes, which positions are stored, until the next sequence, in said counting devices.

8. A device as claimed in claim 7, in which erasure of the background image is effected by the combination of said automatic volume control and said variable opacity disk.

* * * * *

UNITED STATES PATENT OFFICE
CERTIFICATE OF CORRECTION

Patent No. 3,768,909      Dated October 30, 1973

Inventor(s) Noel Henri Leon Ferrier

It is certified that error appears in the above-identified patent and that said Letters Patent are hereby corrected as shown below:

Column 4, line 41, before the period, insert -- after conversion into analog signals in digital/analog converters 37a and 37b --.

Signed and sealed this 4th day of June 1974.

(SEAL)
Attest:

EDWARD M. FLETCHER, JR.
Attesting Officer

C. MARSHALL DANN
Commissioner of Patents